United States Patent [19]
Raimbault et al.

[11] Patent Number: 5,426,423
[45] Date of Patent: Jun. 20, 1995

[54] PROCESS AND DEVICE FOR REGISTERING AND CHECKING ITEMS

[76] Inventors: Pierre Raimbault, 45 Rue Saint Ferdinand F-75017, Paris; Perrin Henri, 34, rue de la Chaux F-69450, Saint Cyr au Mont d'Or, both of France

[21] Appl. No.: 180,191

[22] PCT Filed: Jun. 14, 1990

[86] PCT No.: PCT/FR90/00423
 § 371 Date: Feb. 7, 1992
 § 102(e) Date: Feb. 7, 1992

[87] PCT Pub. No.: WO90/16051
 PCT Pub. Date: Dec. 27, 1990

Related U.S. Application Data

[63] Continuation of Ser. No. 828,954, Feb. 7, 1992, abandoned.

[30] Foreign Application Priority Data

Jun. 14, 1989 [FR] France ................................. 89 07888

[51] Int. Cl.6 .......................... H04Q 9/00; G06K 7/00
[52] U.S. Cl. ............................ 340/825.35; 340/825.54; 235/378; 235/383; 235/472
[58] Field of Search ....................... 340/825.35, 825.54; 235/383, 462, 375, 378, 381, 383, 385, 472, 462; 364/401, 403

[56] References Cited

U.S. PATENT DOCUMENTS

| | | | |
|---|---|---|---|
| 4,663,625 | 5/1987 | Yewen | 340/825.34 |
| 4,766,295 | 8/1988 | Davis et al. | 235/383 |
| 4,862,160 | 8/1989 | Ekchian et al. | 340/825.54 |
| 5,005,125 | 4/1991 | Farrar et al. | 364/403 |
| 5,149,947 | 9/1992 | Collins, Jr. | 235/462 |

FOREIGN PATENT DOCUMENTS 0241148 10/1987 European Pat. Off. .
2555339 5/1985 France .

*Primary Examiner*—Donald J. Yusko
*Assistant Examiner*—Edward Merz
*Attorney, Agent, or Firm*—Larson and Taylor

[57] ABSTRACT

In particular for reducing the waiting time at the checkouts of self-service supermarkets, articles are registered by providing each article with a microcircuit (24) having a loop for picking up high frequency energy and for responding to an interrogation by transmitting a modulated message at high frequency representing an article-identifying signature. An article (20) is taken into account by exciting its microcircuit by applying an energy-supplying and interrogation high frequency signal thereto to cause it to transmit the modulated signal of the signature, the modulated signal is picked up by memory means causing the signatures to correspond to the prices of articles, the price of the interrogated article is stored in a memory, and it is displayed, and the price of the article is added to that of any articles that may previously have been taken into account.

10 Claims, 2 Drawing Sheets

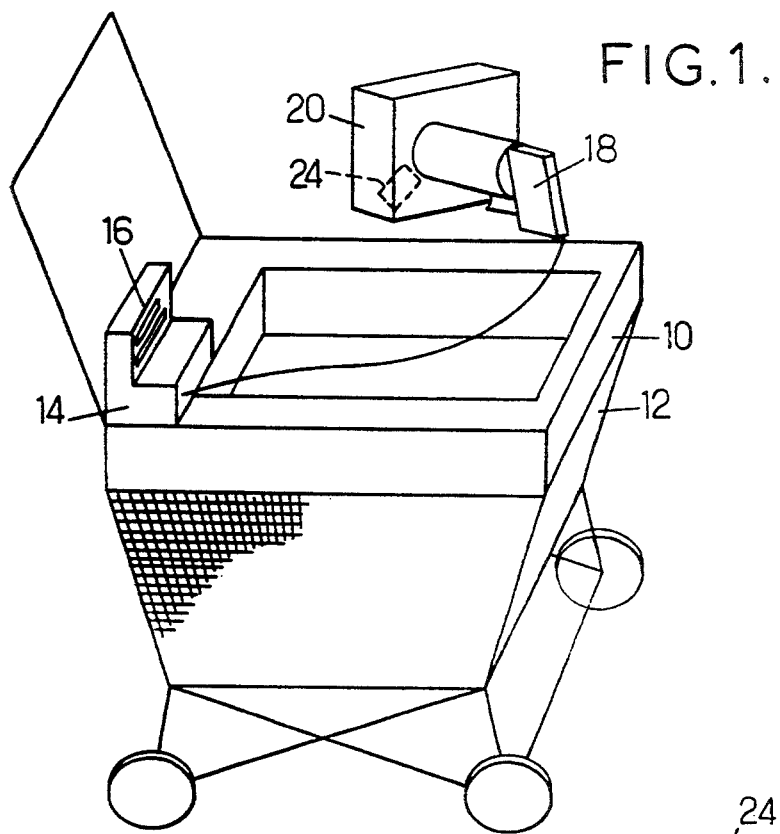
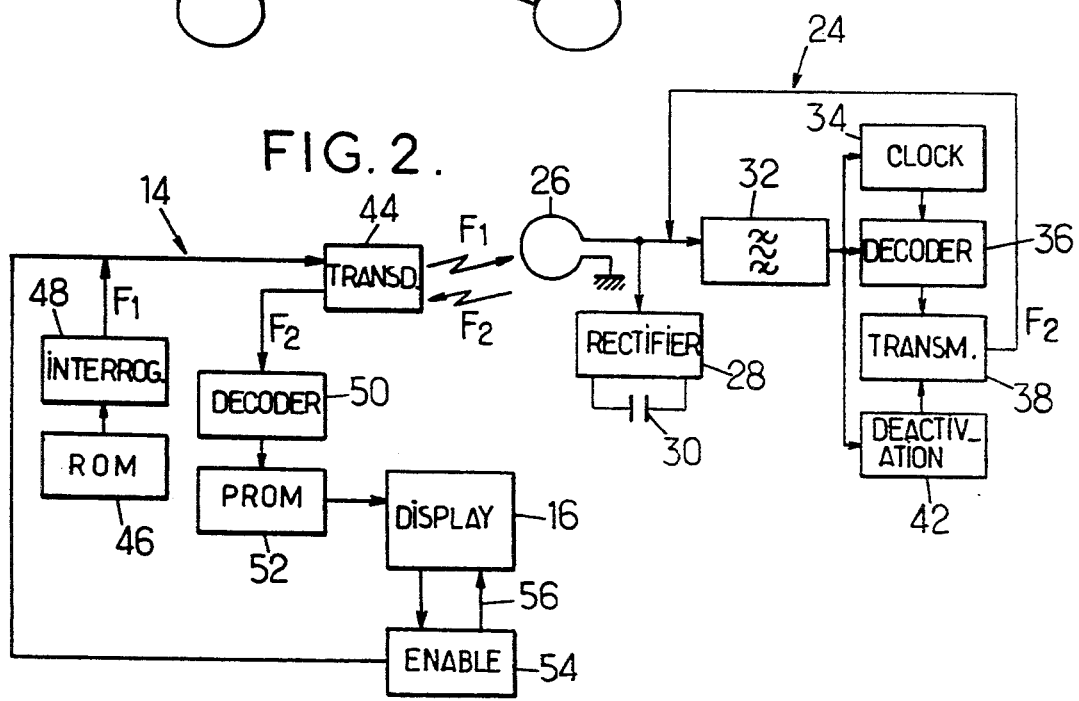

PROCESS AND DEVICE FOR REGISTERING AND CHECKING ITEMS

This application is a continuation of application Ser. No. 07/828,954, filed Feb. 7, 1992, by RAIMBAULT et al., entitled Method and Apparatus for Registering and Clocking Articles, now abandoned.

BACKGROUND OF THE INVENTION

The invention relates to methods and to apparatuses for registering (which term should be understood as meaning taking into account and totalizing the prices of articles purchased) and checking articles, and a particularly important (though not exclusive) application thereof lies in self-service super- and hypermarkets.

At present, a major complaint made by the customers of large stores of this type is the waiting time at the checkout, as made necessary by the need to check articles purchased one by one, to register them, and to pay for them. By using scanning devices for optically reading the bar codes carried by each article, a considerable saving in time is obtained by avoiding the need for the clerk to key in each individual article code or price on the checkout machine. However, because each article is verified by an employee, such a solution is merely a palliative since the time taken by each customer to pass through the checkout is substantially proportional to the number of articles purchased, given that payment time generally represents only a small fraction of the total time spent at the checkout. Taking account of articles purchased requires all of them to be placed on a moving surface, each of them to be verified individually, and then they need to be reloaded.

Another source of dissatisfaction is the near impossibility for a customer to check that the price actually taken into account does indeed correspond to that shown on the shelves. Finally, customers are reticent because they can evaluate the amount they are going to need to pay only quite approximately until the total is displayed at the checkout.

Apparatuses that have been proposed in the past for enabling customers to do their own checking before reaching the checkout solve the second problem in part only and have no effect on the first.

SUMMARY OF THE INVENTION

It is an object of the invention to to provide a method and apparatus that satisfy practical requirements better than those known in the past, in particular in that they avoid the drawbacks mentioned above, or at least they attenuate them.

For this purpose, the invention provides in particular a method whereby, given that each article contains a microcircuit having means for picking up high frequency energy and for responding by transmitting a modulated high frequency message representing an identification signature for the article: an article is taken into account by exciting its microcircuit by applying a high frequency signal thereto that provides it with energy and that interrogates it to cause it to transmit the modulated signal of the signature, the modulated signal is picked up by means including a memory for making the signatures of articles correspond to their prices, the price of the interrogated article is stored and displayed, and the price of the article is added to the price of any articles that may previously have been taken into account.

This method may be implemented in numerous different ways.

In a first implementation, which requires the customer to perform an operation in addition to transferring the selected article from a shelf to a receptacle, the microcircuit in each article is individually excited in turn by passing the article through a read location where it receives an interrogation code common to all of the articles, with each microcircuit being designed to make itself inert after transmitting its code, and all of the purchased articles contained in the receptacle are caused to pass through a location where a high frequency excitation and interrogation field extends, thereby enabling the presence of microcircuits that have not been rendered inert to be detected.

A circuit may be rendered inert automatically after it has finished transmitting its code. However, to limit the risks of error and of fraud, it is preferable to cause circuits to render themselves inert by subjecting a microcircuit to a high frequency field that is modulated with a special code which is transmitted only after the price of the article has been taken into account. Such taking into account may be indicated to the customer by emitting a sound signal, thereby inviting the customer to repeat the read operation if it has not taken place properly.

For the customer, this solution has the advantage of requiring the customer to perform only one operation on going past the checkout, namely to pay, assuming that all of the instructions for taking goods into account have been followed. A drawback that becomes significant only if customer hesitations and clumsiness occur too frequently is that there is no chance of changing one's mind on checking out: a customer who decides not to purchase an article can only do so by going through a conventional checkout where all of the articles actually purchased are identified, unless special means are provided to reactivate the microcircuit of an article that is put back on the shelves while simultaneously deducting its price, and that would complicate the system.

In another implementation of the invention, this drawback is avoided: the microcircuits of all of the articles are excited at a location through which all of the selected and taken articles pass, where a high frequency field is established to provide energy and where successive interrogation codes are transmitted for all possible articles. As explained below, the time required for such interrogation can be kept very short by implementing a sequence of interrogations including tests each serving to determine whether there exists at least one article in a given group (corresponding, for example, to same-value more significant bits in the signature), and omitting interrogation concerning an entire group of articles if the test demonstrates that there are none in the group.

The invention also provides apparatus for implementing the above-defined method.

The invention will be better understood on reading the following description of particular embodiments given by way of non-limiting example.

BRIEF DESCRIPTION OF THE DRAWINGS

FIG. 1 is a diagram showing the principles of apparatus constituting one embodiment of the invention, in which to take account of an article the customer is required to perform a read operation which is distinct from transferring the article from a shelf to a receptacle;

FIG. 2 is a block diagram of the electronics contained in the apparatus of FIG. 1;

DESCRIPTION OF PREFERRED EMBODIMENTS

Figure 3:
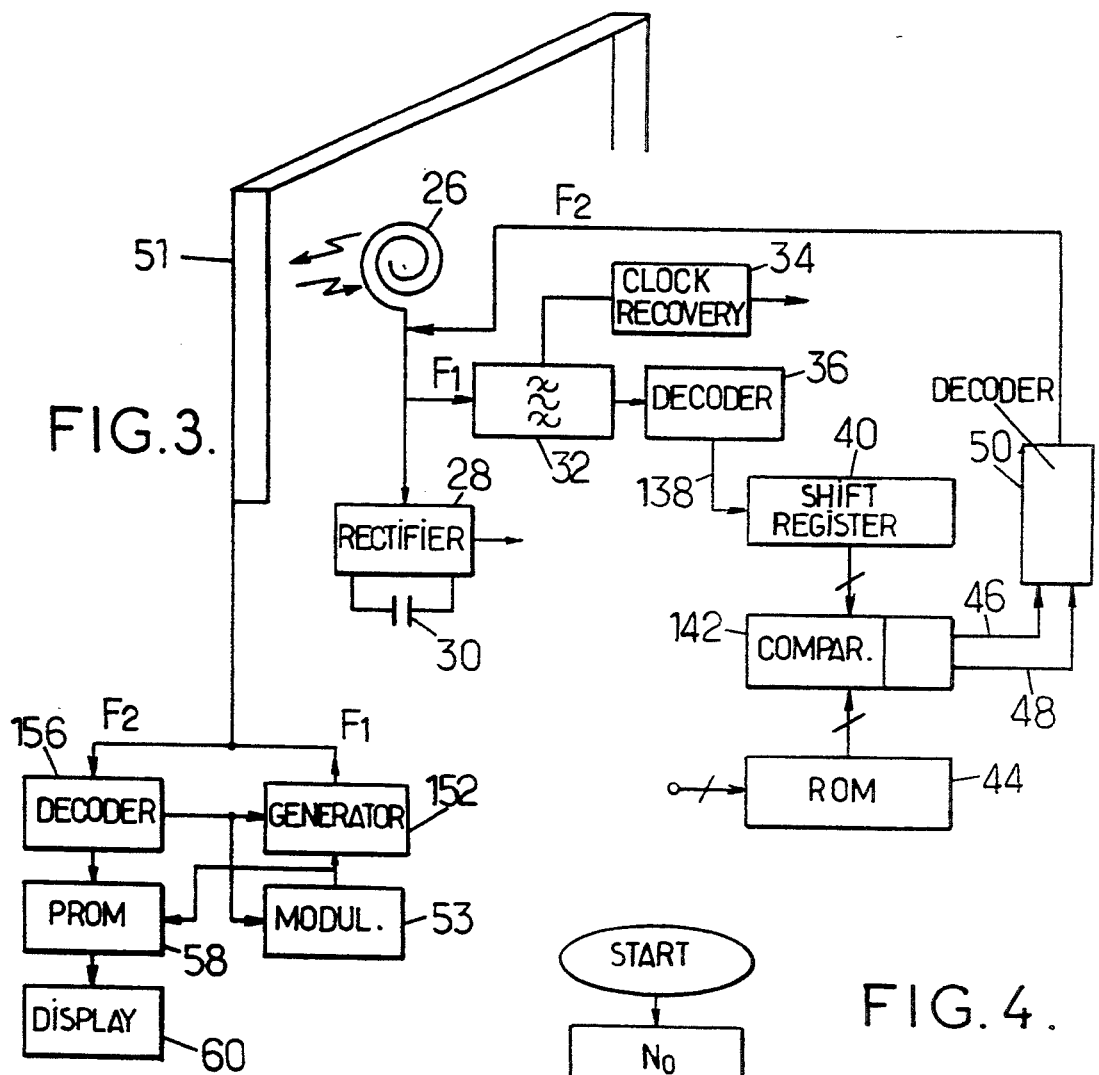
FIG. 3 is a block diagram showing the principles of apparatus constituting a different embodiment of the invention.

The apparatus of the invention may have the physical structure shown in outline in FIG. 1. The apparatus is carried by a lockable frame 10 on the top of a cart or trolley 12, e.g. locked by means of a lock enabling the frame 10 to be removed after passing the checkout should the customer desire to push the cart to a parked vehicle. The frame 10 carries an electronics block 14 provided with a display 16 and a reader 18.

Each article made available to customers contains an identification label 24 to which the customer cannot gain access so long as the packaging remains intact. Each label 24 contains a microcircuit which does not have its own independent energy supply. However, the microcircuit does include means for picking up high frequency energy, means for transmitting a signature that identifies the article in response to receiving an interrogation code constituted by modulation on a high frequency carrier F1, and means for storing sufficient energy to enable the microcircuit to operate.

In the embodiment shown in FIG. 2, the microcircuit incorporated in each label includes a power supply loop 26 for placing in a high frequency field F1. This loop is connected to a rectifier circuit 28 for storing energy on a capacitor 30. The loop 26 also serves to pick up the interrogation code which is the same for all articles in the embodiment shown in FIG. 2.

An interrogation code detecting branch includes a bandpass filter 32 for isolating the interrogation frequency F1, a clock recovery circuit 34, and a decoder circuit 36. When this circuit identifies the interrogation code, it excites a circuit 38 for transmitting the signature of the article in the form of a signal at a high frequency F2 which is modulated in amplitude or frequency. The signature may be constituted, for example, by a word comprising a plurality of bits. The modulated signal at the frequency F2 is applied to the loop which then serves as a transmission antenna.

The microcircuit also includes a deactivation member 42 capable of operating in a manner explained below to inhibit the code-transmitting circuit 38 after the article which contains the microcircuit has been taken into account.

The electronics 14 includes a transducer 44 fitted with an antenna (not shown) enabling a field to be radiated at a high frequency F1 and supplying a signal when placed in a field at a high frequency F2. The electronics includes an interrogation branch constituted by a memory 46 for storing the interrogation code and a generator 48 for generating a signal constituted by a carrier at the frequency F1 which is either pure or modulated by the interrogation code 46. A reception branch includes a decoding circuit 50 which is generally provided by an inlet bandpass filter centered on the frequency F2 and a transcoding programmable read-only memory (PROM) 52 making each article signature correspond with a price and possibly with an identification message. The output from the PROM is applied to the input circuit of the display 16 which includes totalizing means. In the embodiment shown, this display input circuit is connected to a validation and inhibition circuit 54 having the following functions:

causing an inhibition instruction that excites the circuit 42 to be transmitted to the microcircuit in the article; and sending a confirmation pulse 56 to the counting means of the display 16 when the emission circuit 38 of the microcircuit ceases to transmit its signature because it has been inhibited.

The sending of the confirmation pulse may be indicated to the customer by means of a sound signal and/or by means of a visible signal.

For greater simplicity, FIG. 2 does not show the power supply to the various circuits, nor does it show conventional clock and synchronizing circuits in the electronics block 14.

The apparatus described above operates as follows.

The customer seeking to purchase an article must cause the article to be taken into account before placing it in the cart 12. To do this, the customer causes a reader 18 to scan either the entire article or else a special zone of the article containing the microcircuit 24 transducer 44 (assuming that the location of the label can be seen from the outside). The reader may be provided with an on/off pushbutton so as to prevent it operating continuously. The reader then transmits successive and separate sequences each constituted by an initial train that is continuous for delivering the energy required to charge the capacitor 30 in the microcircuit, followed by a train that is modulated with the interrogation code.

When the microcircuit is in the transmitted field and when it identifies an interrogation, it responds by transmitting a signal via its loop 26 during the silences between the sequences transmitted by the electronics block 14. The signal is constituted by a carrier at a high frequency F2 which is different from F1, and which is modulated with a signature characteristic of the article. The decoded signature is transmitted to the transcoding PROM 52 which may be updated periodically. The output from the memory causes the price of the article to appear on the display 16, optionally accompanied with an indication of the kind of article concerned.

Once an article has been effectively taken into account, the input circuit to the display excites the inhibition circuit 54 which applies a signal to the transducer 44 for inhibiting the transmission circuit 38 of the microcircuit. The inhibition instruction may be transmitted at the frequency F1, particularly if interrogation has come to an end. After it has received the inhibition instruction, the microcircuit no longer transmits its signature. This interruption of transmission is detected by the decoding circuit 50 (the interruption of transmission could be replaced by transmitting a final word indicating that inhibition has occurred). Once inhibition has been observed, an instruction is transmitted by the circuit 54 confirming that the article has been taken into account, and the price of the article is added to the total that has already been taken into account.

The apparatus of the invention further includes checking means situated at a location through which all purchased articles pass: this location may be constituted by the empty space delimited by the frame at the inlet to the cart 12 in which all articles must be placed if they are to leave the store via the checkout. A simpler solution consists in providing such a location upstream from each of the payment checkouts. This location may be constituted physically by a door-frame or gateway through which the receptacle passes. The gateway (not shown) contains electronics for transmitting sequences identical to those provided by the generator 48 in each electronics block 14, but it provides an electromagnetic field that is much more intense than do the readers, thereby enabling it to excite the microcircuits of all articles passing through the checking location.

If one or more of the microcircuits have not been inhibited, then the corresponding signatures are transmitted. Such emission is detected and raises an alarm that requires the customer to pass through a conventional checkout where articles are checked manually. The detection means at the location delimited by the gateway must be more sensitive than those in each of the electronics blocks 14, given that the transducers may be at a greater distance from the microcircuits.

To avoid damaging microcircuits that have not been inhibited as they go through the check location, i.e. where the energy received by the loop 26 may in some circumstances be very much higher than the energy received during normal reading, the energy storage means 28 may be provided with charge-limiting means (not shown). In practice, it is sufficient to have a capacitor capable of storing the energy required for transmitting a signal during several milliseconds.

In the embodiment of the invention shown diagrammatically in FIG. 3, the microcircuit contained in each article has components that are similar to those shown in FIG. 2 and which are therefore designated by the same reference numerals. The microcircuit of FIG. 3 includes a power supply loop 26 connected to a rectifier 28 provided with an energy storage capacitor 30. An interrogation code detection branch includes a bandpass filter 32, a clock recovery circuit 34, and a decoding circuit 36. This circuit is designed, for example, to provide in series on its output 138 the V bits of a word representing the "signature" of an article whose presence is to be determined. The successive bits are loaded into a shift register 40 connected to a V-bit comparator 142 which also receives the identification signature of the article in question as stored on manufacture in a read-only memory (ROM) 44. To make searching for articles brought to the read location faster, the comparator 142 is advantageously designed to provide a first signal on an output 46 when coincidence occurs between a determined fraction of the signature stored in 44 and the corresponding fraction provided by the decoder 36, and to provide a second signal on an output 48 in the event of full coincidence. These signals are applied to a generator for generating a modulated frequency F2 so as to apply a different signal to the loop 26 depending on whether it is merely some of the bits that have been observed to be identical (e.g. the $V_m$ more significant bits), and a second signal in the event of full coincidence.

If it is now assumed that the detection location is physically constituted by a gateway 51 placed immediately upstream from the checkouts, the gateway may be associated with means capable of identifying and taking account sequentially of the various articles placed, for example, in a cart passing through the gateway.

The gateway includes a generator for generating a signal at the frequency F1 and associated with a modulator 53 for encoding short duration pulses at the frequency F1 with interrogation codes that correspond to the signatures of articles that may be passing through the gateway. The generator 152 is connected to an antenna contained in the gateway. The antenna is also connected to a reception path including an assembly for filtering the frequency F2, for decoding the presence messages provided by 50, and for identifying them. This assembly is designated 156 in FIG. 3 and in the event of recognition it causes the identified article to be taken into account by means of a transcoding table (where the transcoding table is a PROM 58 which takes account of the price of a product and which displays corresponding data via a display 60). The signature identifying the product is applied to the transcoding table 58 via 53.

The apparatus further includes confirmation means which may be of the same kind as those shown in FIG. 2.

Figure 4:
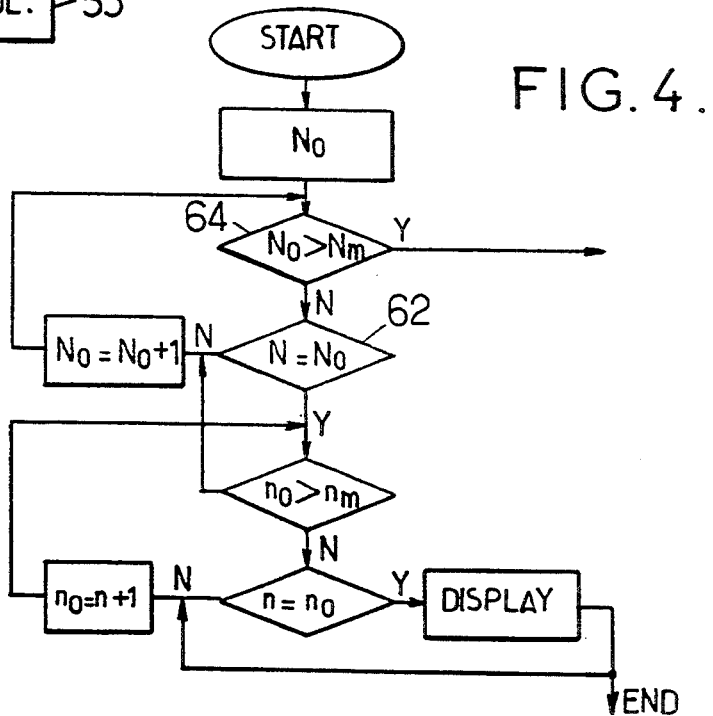
FIG. 4 is a flow chart showing one example of a sequence during the accounting operations that take place when going through a gateway in the embodiment of FIG. 3.

The flow chart for interrogation and taking into account may be as shown in FIG. 4 in a relatively rudimentary embodiment in which each article is designated by a V-bit signature comprising $V_m$ more significant bits representing a number lying between a determined value $N_O$ and a maximum value $N_m$, and less significant bits defining a number lying between $n_O$ and a maximum value $n_m$:

in a first step, a check is made to determine whether articles exist including signatures that belong to the subgroup whose more significant bits represent a given number, with all possible numbers N being tested in succession; and only once the test has shown the presence of at least one such article, all of the numbers capable of being represented by the less significant bits are interrogated in turn.

At the beginning of the operation (FIG. 4), a test 62 is performed to determine whether articles are present whose more significant bits represent a predetermined initial number $N_O$ (which may be zero). If the test gives a negative result, $N_O$ is incremented by unity. Before performing the test 62 again, a check 64 is performed to ensure that the new value $N_O$ does not exceed the maximum $N_m$: if it does that is the end of the process.

If the test indicates that there is at least one article, then each of the numbers that can be represented by the less significant bits is interrogated by comparing n with $n_O$ (which is initially at a value that may be zero, and which then is incremented through successive values by unity).

In the event of full coincidence, display and taking into account operations are performed and the loop then returns to the beginning.

In a more elaborate embodiment, suitable for reducing the number of ineffective tests, the flow chart includes a larger number of loops. The first test is performed on the most significant bit only. Successive tests are then performed on two bits, three bits, etc.

The duration of an identification sequence for an article can be reduced to about 10 ms, which makes it possible even with a very large number of articles to keep the waiting time required at the read location down to about one second.

The above-described mode of interrogation using identification by binary modulation in baseband does not work when the cart contains a plurality of identical articles. This drawback may be avoided by extending the article code by three or four digits. During manufacture of a batch (carried on a pallet) all of the articles in the batch are given the same article code, but they are given different extension numbers (from 000 to 999 or from 0000 to 9999).

It is thus unlikely that a customer will take two identical articles from the shelves having the same extension code. It then suffices merely to continue the depth of the questioning to determine reliably the number of articles concerned.

If the location at which articles are taken into account is the inlet to the cart, i.e. if the cart is provided with electronics, then the sequence for taking articles into account as they are inserted can be simplified by providing display means that require the customer to hold an article taken from the shelves at the read location until a confirming sound beep is given and by providing a visual display of a wrong operation.

The invention may be implemented in other ways and it must be understood that the scope of the present patent extends to such variants, and more generally to any other variants that may be considered equivalents.

We claim:

1. A method for entering into account and checking articles picked up by a customer, comprising the steps of:
    providing each of said articles with a microcircuit having means for receiving high frequency energy and means for transmitting a modulated high frequency message in response thereto, said message being representative of a signature identifying the respective article;
    generating an energy supplying interrogation high frequency signal at a predetermined location in a path of transfer of each of said articles which is transferred by a customer into a customer available receptacle, whereby the microcircuit of said selected article, when passed through said predetermined location, delivers the respective message, said microcircuit being arranged for becoming inert upon delivery of said message,
    directing each said message to circuit means carried by said receptacle and programmed for indicating a price of each said article upon receipt of the signature thereof,
    electronically storing said price, displaying said price and adding said price to an accumulated amount representing the sum of the prices of previously transferred said articles;
    and passing said receptacle through a checking location where a high frequency energization and interrogation field prevails for detecting microcircuits which have not been previously rendered inert.

2. A method according to claim 1, characterized in that a high frequency field is generated which is modulated with a special code and which is transmitted only when the price of the article has been taken into account.

3. Apparatus for entering into account and checking articles purchased by a customer, comprising:
    on each of a plurality of articles available for purchase to customers, a microcircuit having means for receiving high frequency energy at a predetermined frequency and means for transmitting, in response thereto, a message which is representative of a signature identifying the respective article, said microcircuit being arranged for becoming inert upon delivery of said message;
    on each of a plurality of receptacles available to customers, circuit means for generating an energy supplying interrogation field at said predetermined high frequency, said means arranged for any said article which is transferred by a customer into the receptacle, to cross said interrogation field, said circuit means being programmed for indicating a price of each said article upon receipt of the signature thereof, for electronically storing said price, for displaying said price and for adding said price to an accumulated amount representing the sum of the prices of possibly transferred said articles;
    and means for generating a further high frequency energization and interrogation field at a check-out location for detecting possible microcircuits which have not been previously rendered inert.

4. Apparatus according to claim 3, characterized in that the display is provided with an input circuit connected to a validating and inhibiting circuit (54) for transmitting an instruction to the microcircuit of an article for inhibiting subsequent operation of the microcircuit.

5. Apparatus according to claim 3, wherein said circuit means on each said receptacle comprises a reader containing a transducer for coupling with each said microcircuit and connected to an interrogation path having a memory for storing a general interrogation code for the microcircuits and to a reception path having: a decoding circuit; a transcoding programmable read-only memory for causing each article signature provided by the microcircuit of an article to correspond to a price; and a display associated with totalizing means.

6. A method for entering into account and checking articles picked up by a customer, comprising the steps of:
    providing each of a plurality of articles available to customers with a microcircuit having means for receiving high frequency energy and means for transmitting a modulated high frequency message in response to receipt of a specific interrogation high frequency code, said message being representative of a signature identifying the respective article;
    generating an energy supplying interrogation high frequency signal at a predetermined location in a path followed by a receptacle containing articles purchased by a customer for check out, said signal sequentially containing the specific interrogation codes for all possible articles; and
    collecting each signature message at said predetermined location, directing each signature message to circuit means programmed for determining price of each said article upon receipt of a signature thereof, electronically storing said price, and adding said price to an accumulated amount representing the sum of the prices of previously identified said articles, wherein:
    said message identifying said signature consists of a plurality of bits, having predetermined most significant bits and predetermined less significant bits, and
    said interrogation high frequency signal first contains one of said specific interrogation codes only containing predetermined most significant bits belonging to a plurality of possible ones of said signatures and proceeds with interrogation codes further including predetermined less significant bits only if a test reveals that there are signatures including said predetermined most significant bits.

7. A method according to claim 6, wherein each said signature is identified as a word having a plurality of bits and wherein said sequence successively comprises:

testing whether articles exist whose signature includes a predetermined value of most significant bits among said plurality of bits, if the test is negative, testing whether articles are present whose signature includes other values of said most significant bits, if the test is positive, testing whether articles are present whose signature includes said predetermined most significant bits plus at least one predetermined less significant bit, and repeating said sequence with an increasing number of bits until all articles have been identified.

8. A method according to claim 7, wherein identical ones of said articles have a signature consisting of a common article multi-digit code and of a multi-digit extension number which is not the same for all said identical articles.

9. A method for entering into account and checking articles, comprising the steps of:

(a) providing each of a plurality of articles with a microcircuit having means for receiving high frequency energy and means for transmitting a modulated high frequency message in response to receipt of a respective interrogation high frequency code in the form of a word having a plurality of bits, said interrogation code and said message being representative of a signature identifying the respective article;

(b) generating an interrogation sequence at a predetermined location in a path followed by a plurality of articles among said articles, as an energy supplying interrogation high frequency signal, said signal sequentially containing the specific interrogation codes for all possible articles present in said receptacle;

(c) collecting each signature message at said predetermined location and directing it to circuit means for precising said signature message and for giving and storing identification indication;

wherein said interrogation sequence comprises:

(b1) a first interrogation as to whether there is at least one article among said plurality of articles whose interrogation code includes at least one predetermined most significant bit;

(b2) if a message is received in response to said first interrogation, a second interrogation as to whether there is at least one article among said plurality of articles whose interrogation code includes said predetermined most significant bit and at least one predetermined immediately less significant bit;

(b3) if no message is received in response to said first interrogation, another interrogation as to whether there is at least one article among said plurality of articles whose interrogation code includes at least one most significant bit different from said one predetermined most significant bit, and (b4) repeating steps (b1), (b2) and (b3) with more and more bits until the least significant bit in the interrogation code of all said plurality of articles is identified.

10. A method according to claim 9, wherein identical ones of said articles have a signature consisting of a common article multi-digit code and of a multi-digit extension number which is not the same for all said identical articles.

* * * * *